United States Patent
Koker et al.

(10) Patent No.: US 10,580,109 B2
(45) Date of Patent: *Mar. 3, 2020

(54) DATA DISTRIBUTION FABRIC IN SCALABLE GPUS

(71) Applicant: Intel Corporation, Santa Clara, CA (US)

(72) Inventors: Altug Koker, El Dorado Hills, CA (US); Lakshminarayanan Striramassarma, El Dorado Hills, CA (US); Akif Ali, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,899

(22) Filed: May 21, 2019

(65) Prior Publication Data

US 2019/0272615 A1 Sep. 5, 2019

Related U.S. Application Data

(63) Continuation of application No. 16/039,509, filed on Jul. 19, 2018, now Pat. No. 10,346,946, which is a
(Continued)

(51) Int. Cl.
*G06T 1/20* (2006.01)
*G06T 1/60* (2006.01)
(Continued)

(52) U.S. Cl.
CPC ................ *G06T 1/20* (2013.01); *G06F 15/08* (2013.01); *G06T 1/60* (2013.01); *G06T 11/001* (2013.01);
(Continued)

(58) Field of Classification Search
None
See application file for complete search history.

(56) References Cited

U.S. PATENT DOCUMENTS

| 7,538,772 B1 | 5/2009 | Fouladi et al. |
| 8,625,422 B1 | 1/2014 | Finney et al. |

(Continued)

FOREIGN PATENT DOCUMENTS

| CN | 101366004 A | 2/2009 |
| CN | 101872314 A | 2/2010 |

(Continued)

OTHER PUBLICATIONS

Chinese Office Action for Application No. 201580029016.8, dated Jan. 22, 2019, 13 pages.
(Continued)

*Primary Examiner* — Peter Hoang
(74) *Attorney, Agent, or Firm* — Jaffery Watson Mendonsa & Hamilton LLP

(57) ABSTRACT

One embodiment provides for a processor comprising a three-dimensional (3D) integrated circuit stack including multiple graphics processor cores and interconnect logic to interconnect the graphics processor cores of the 3D integrated circuit stack to enable data distribution between the graphics processor cores over a virtual channel including multiple programmatically pre-assigned traffic classifications.

20 Claims, 15 Drawing Sheets

Related U.S. Application Data continuation of application No. 15/083,689, filed on Mar. 29, 2016, now Pat. No. 10,102,604, which is a continuation of application No. 14/320,478, filed on Jun. 30, 2014, now Pat. No. 9,330,433.

(51) Int. Cl.
| | | |
|---|---|---|
| *G06F 15/08* | (2006.01) | |
| *G06T 11/00* | (2006.01) | |
| *G06T 15/00* | (2011.01) | |
| *G06T 15/80* | (2011.01) | |
| *H04L 12/933* | (2013.01) | |

(52) U.S. Cl.
CPC ............ *G06T 15/005* (2013.01); *G06T 15/80* (2013.01); *H04L 49/109* (2013.01)

(56) References Cited

U.S. PATENT DOCUMENTS

| | | |
|---|---|---|
| 2007/0126559 A1 | 6/2007 | Adachi |
| 2007/0136559 A1 | 6/2007 | Devins et al. |
| 2009/0248983 A1 | 10/2009 | Offen et al. |
| 2010/0274879 A1 | 10/2010 | Wolfe |
| 2011/0087864 A1 | 4/2011 | Duluk, Jr. et al. |
| 2013/0138892 A1 | 5/2013 | Loh et al. |
| 2013/0141442 A1 | 6/2013 | Brothers et al. |
| 2013/0163611 A1 | 6/2013 | Armstrong et al. |
| 2014/0121567 A1 | 5/2014 | Kaburlasos et al. |
| 2014/0177626 A1 | 6/2014 | Thottethodi |

FOREIGN PATENT DOCUMENTS

| | | |
|---|---|---|
| EP | 3161783 | 5/2017 |
| JP | 2013516006 A | 5/2013 |
| SG | 11201610016 A | 12/2016 |
| WO | 2007067562 A2 | 6/2007 |
| WO | 2013186694 A2 | 12/2013 |
| WO | 2016003544 | 1/2016 |

OTHER PUBLICATIONS

Notification of JP Publication for Application No. 2016/568914 (PUB No. 2017-517810), dated Jun. 29, 2017, 41 pages.
Notification of CN Publication for Application No. 201580029016.8 (PUB No. 106462939), dated Feb. 22, 2017, 45 pages.
Jaekyu Lee et al., "Adaptive virtual channel partitioning for network-on-chip in heterogeneous architectures", ACM Transactions on Design Automation of Electronic Systems, ACM, Newyork, NY, US, vol. 18, No. 4, Oct. 25, 2013 (Oct. 25, 2013), pp. 1-28, XP058033850, ISSN: 1084-4309, DOI: 10.1145/2504906.
Agarwal A et al: Survey of Network on Chip (NoC) architectures & contributions1 Journal of Engineering, Computing Andarchitecture 2009 Scientific Journals International (SJI) USA,vol. 3, No. 1, Jan. 2009 (Jan. 2009), XP002573800.
Masoud Oveis Gharan et al: "A Novel Virtual Channel Implementation Technique for Multi-core On-chip Communication", Applications for Multi-Core Architectures (WAMCA), 2012 Third Workshop on, IEEE, Oct. 24, 2012 (Oct. 24, 2012), pp. 36-41, XP032276753, DOI: 10.1109/WAMCA.2012.12 ISBN: 978-1-4673-5025-9.
Robert Mullins Ed Steve Leibson: 3,11 "Minimising Dynamic Power Consumption in On-Chip Networks", System-On-Chip, 2006. International Symposium on, IEEE, PI, Nov. 2006 (Nov. 2006), pp. 1-4, XP031053843, ISBN: 978-1-4244-0621-O.
Supplementary European Search Report, EP Application No. EP15814544, dated Feb. 7, 2018, 10 pages.
Office Action for EP Application No. EP15814544.1, dated Mar. 15, 2018, 2 pages.
Geza Szabo et al., "Traffic classification over Gbit speed with commodity hardware", IEEE J. Communications Software and Systems, vol. 5, 2010 (Https://scholar.google.comcitations?view_op=view_citation&hl=en&user=N1w10DoAAAAJ&citation_for_view=N1wf0DoAAAAJ:qlMakFHDy7sc).
Gharan, M.O, et at, A Novel Virtual Channel Implementation Technique for Multl- core On-chip Communication: In: Applications for Multi-Core Architectures {WAMCA}, 2012 Third Workshop on, IEEE, pp. 36-41, Oct. 24-25, 2012 (https://ieeexplore.ieee.on:i/xpl/articleDetails.jsp?arnumber=6374750).
PCT/US2015/0305i3, Notification of Transmittal of the International Search Report and the Written Opinion of the International Search Authority dated Jul. 30, 2015, p. 12.
JP Application No. JP2016568914, Notice of Reasons for Refusal, 7 pages, dated Jan. 31, 2018.
Korean Application No. 2016-7033417, Notice of Preliminary Rejection, 14 pages, dated Dec. 19, 2017.
Korean Application No. 2016-7033417, Notice of Allowance, 6 pages, dated Jul. 27, 2018.
CN Office Action for CN Application No. 201580029016.8, dated Aug. 28, 2019, 6 pages.
CN Office Action for CN Application No. 201580029016.8, dated Oct. 11, 2019, 10 pages.
Notification of Publication for EP Application No. 19186031.1, 1 page, dated Nov. 15, 2019.
Extended European Search Report for EP Application No. 19186031.1, 9 pages, dated Oct. 10, 2019.
Notification of Publication for CN Application No. 201910463455.X, 40 pages, dated Nov. 12, 2019.

SAMPLE COMMAND FORMAT
900

SAMPLE COMMAND SEQUENCE
910

DATA DISTRIBUTION FABRIC IN SCALABLE GPUS

CROSS REFERENCE TO RELATED APPLICATIONS

The present patent application is a continuation application claiming priority from U.S. application Ser. No. 16/039,509, filed Jul. 19, 2018, which claims priority from U.S. application Ser. No. 15/083,689, filed Mar. 29, 2016 which claims priority from U.S. Pat. No. 9,330,433, issued on May 3, 2016, the contents of which are incorporated herein in their entirety by reference.

BACKGROUND

Field of the Disclosure

Embodiments are generally related to information processing, and more particularly to a data distribution fabric for use in scalable graphics processors.

Description of the Related Art

Multi-core graphics processing units have become normalized among computing systems ranging from system on a chip (SOC) integrated circuits to high-end discrete graphics processors. In the real of high-end graphics, multi-core solutions are the primary method of increasing graphics processing performance. For SOC solutions, the use of multi-core graphics processors allows a reduction in system power while allowing high performance during periods of high graphics processor workload.

However, the increase in the number of graphics cores within a component creates scalability issues when developing graphics processing solutions that span multiple power and performance segments. The multi-core communication solutions used in high-end graphics products are not suitable for low-power products due to issues of cost and power consumption. The communication solutions used in low-power graphics generally do not provide sufficient performance for high-end graphics solutions. For example, one graphics core communication solution is to couple the various graphics processors via unique data distribution channels. However, using unique communication channels presents difficulties for designing graphics processors that are intended to span multiple power and performance segments.

BRIEF DESCRIPTION OF THE DRAWINGS

The following description includes discussion of figures having illustrations given by way of example of implementations of the various embodiments. The figures should be understood by way of example, and not by way of limitation, in which.

DETAILED DESCRIPTION

The following description describes processing logic for a data distribution fabric for use in scalable graphics processing units included within or in association with a processor, computer system, or other processing apparatus. For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments.

Although some of the following embodiments are described with reference to a processor, similar techniques and teachings can be applied to other types of circuits or semiconductor devices, as the teachings are applicable to any processor or machine that performs data manipulations.

Figure 1:
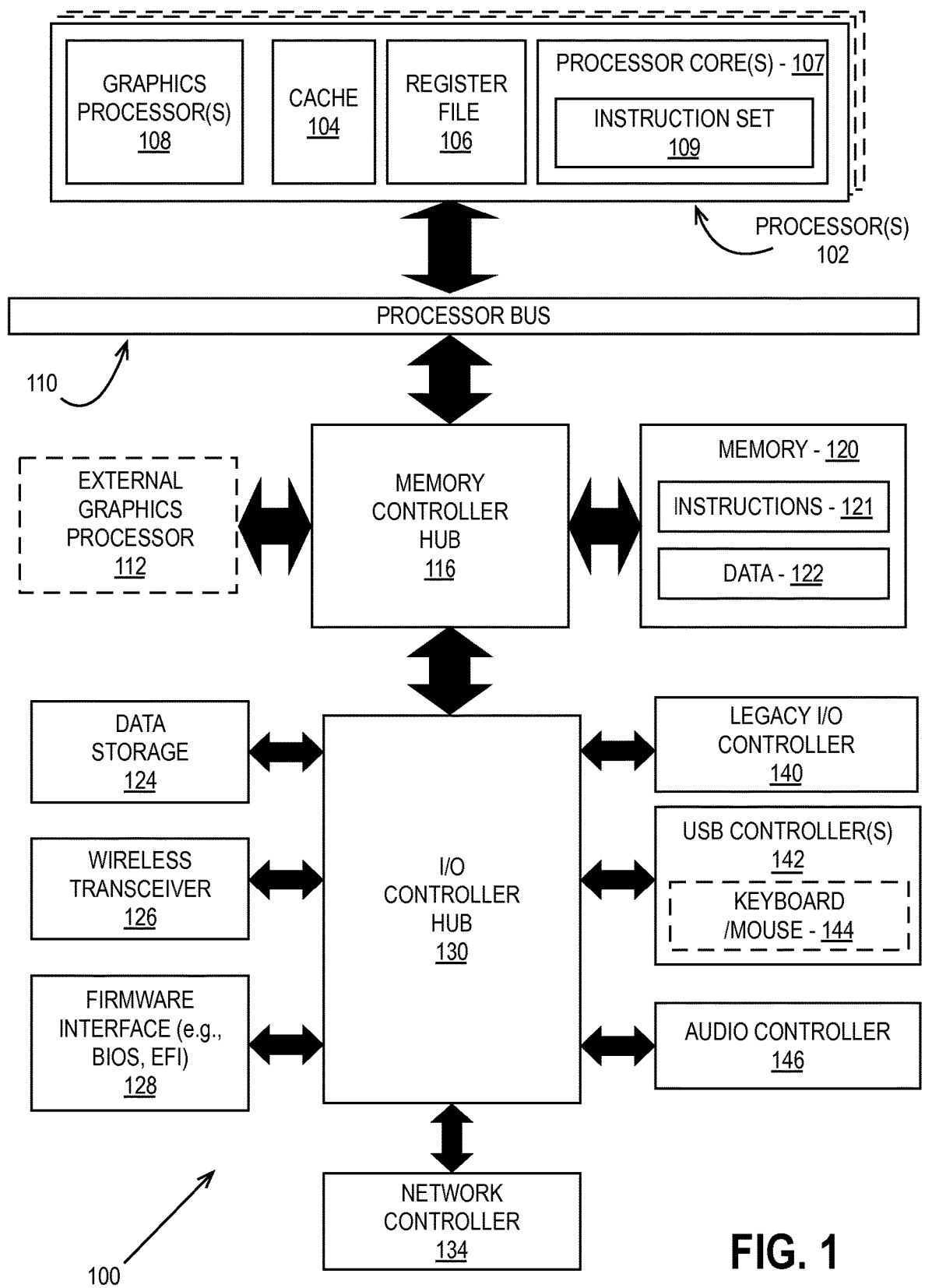
FIG. 1 is a block diagram of an embodiment of a computer system with a processor having one or more processor cores and graphics processors.
Figure 2:
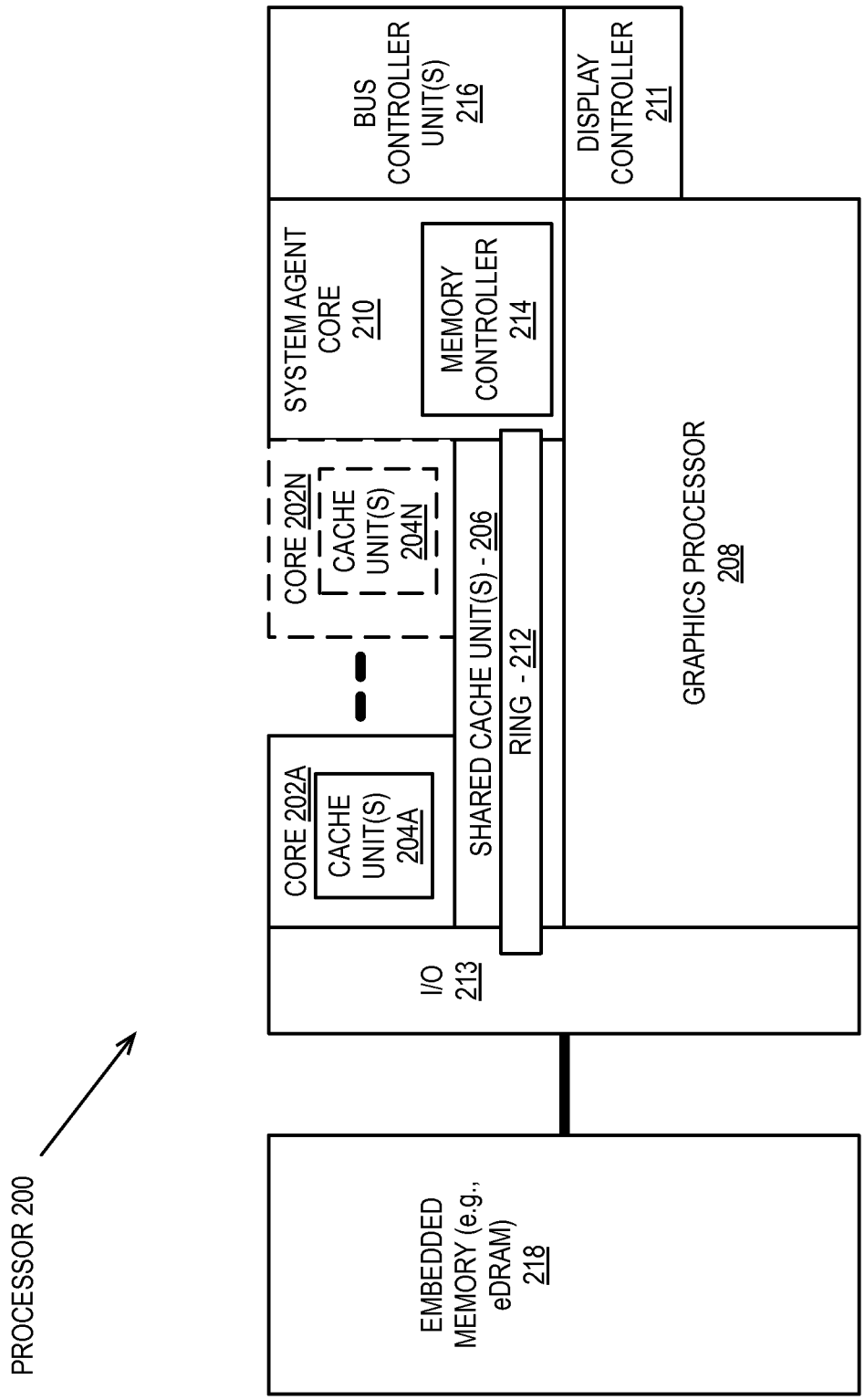
FIG. 2 is a block diagram of one embodiment of a processor having one or more processor cores, an integrated memory controller, and an integrated graphics processor.
Figure 3:
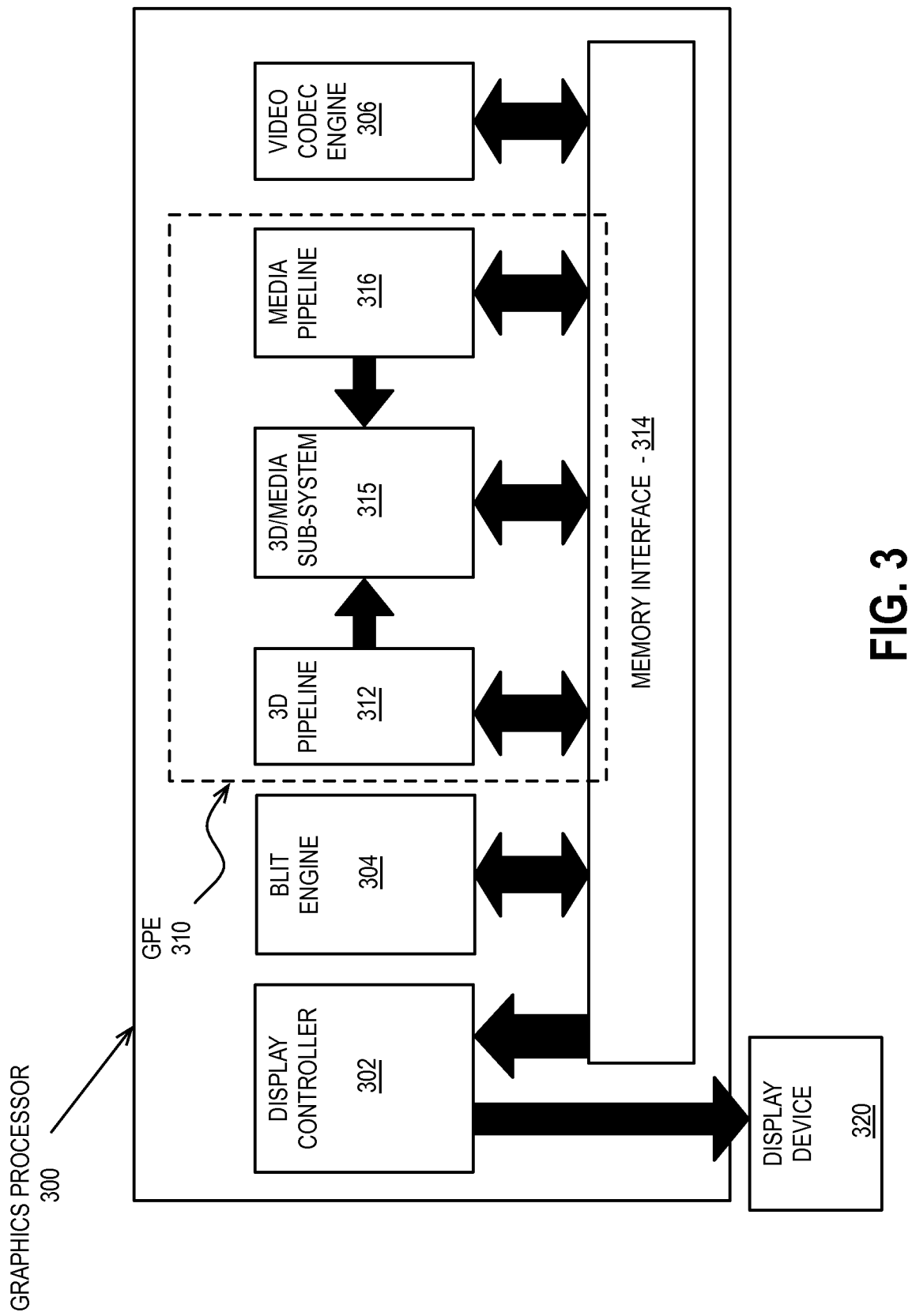
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include or be incorporated within a server based gaming platform or a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, each of the one or more processors 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processor 108 in the processor 102 to perform graphics and media operations. The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
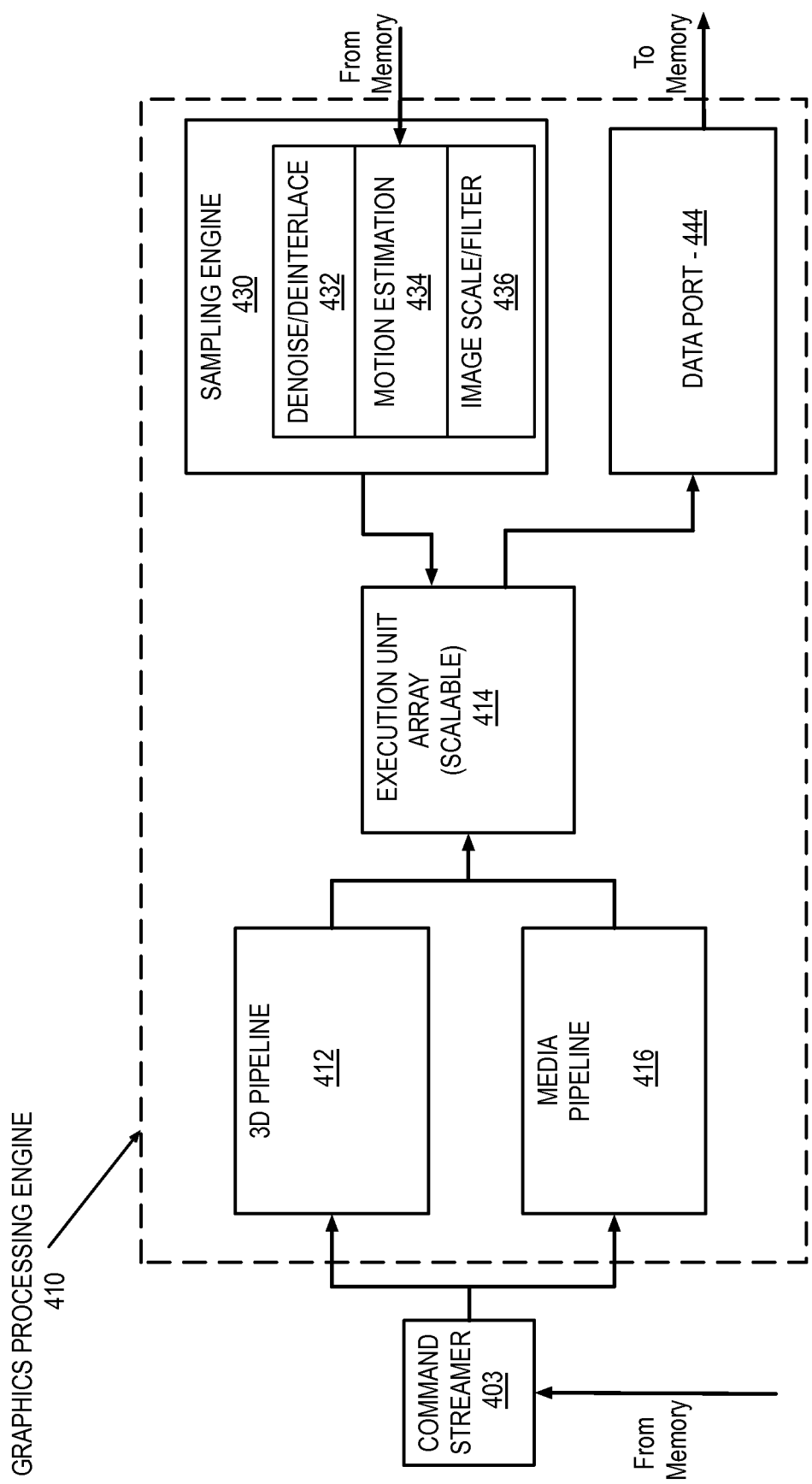
FIG. 4 is a block diagram of an embodiment of a graphics-processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
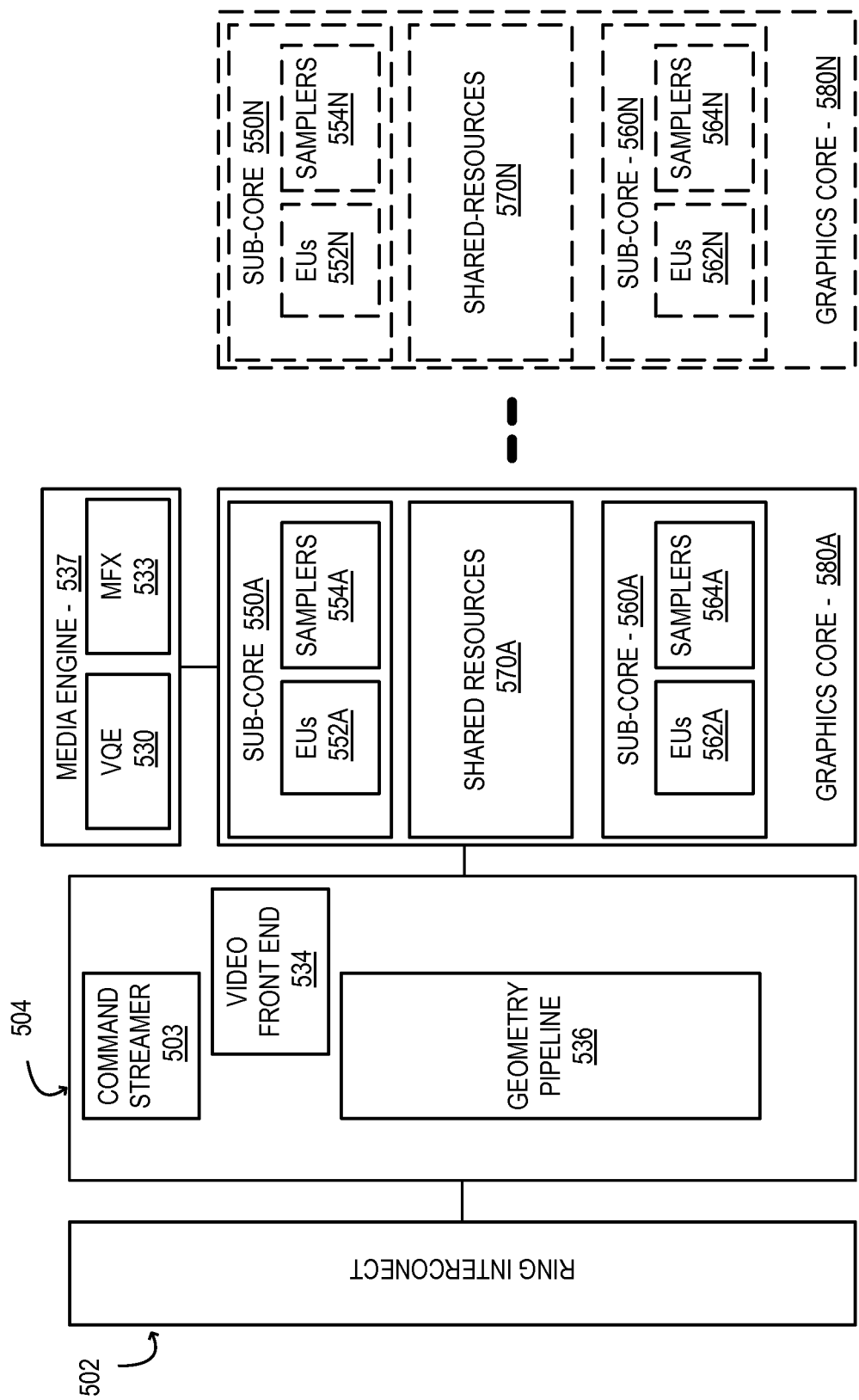
FIG. 5 is a block diagram of another embodiment of a graphics processor.
Figure 6:
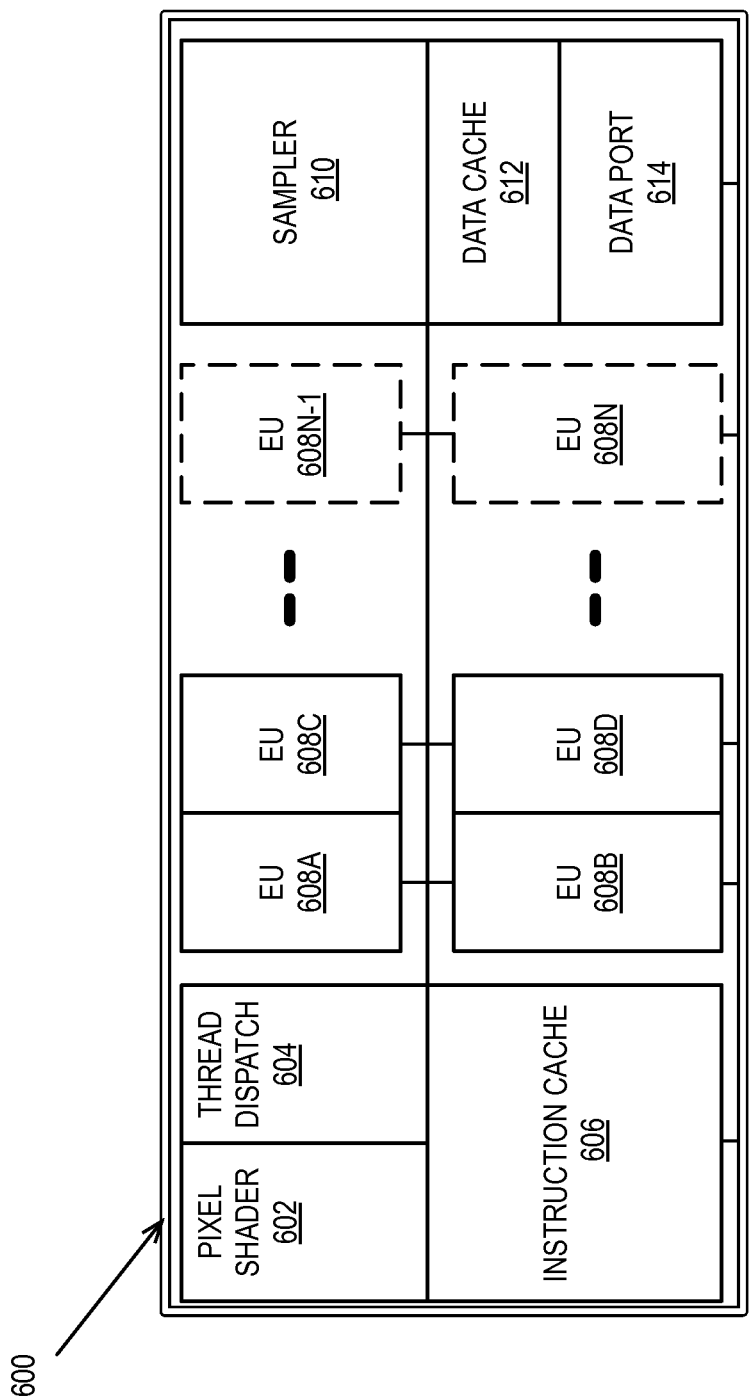
FIG. 6 is a block diagram of thread execution logic including an array of processing elements.
Figure 7:
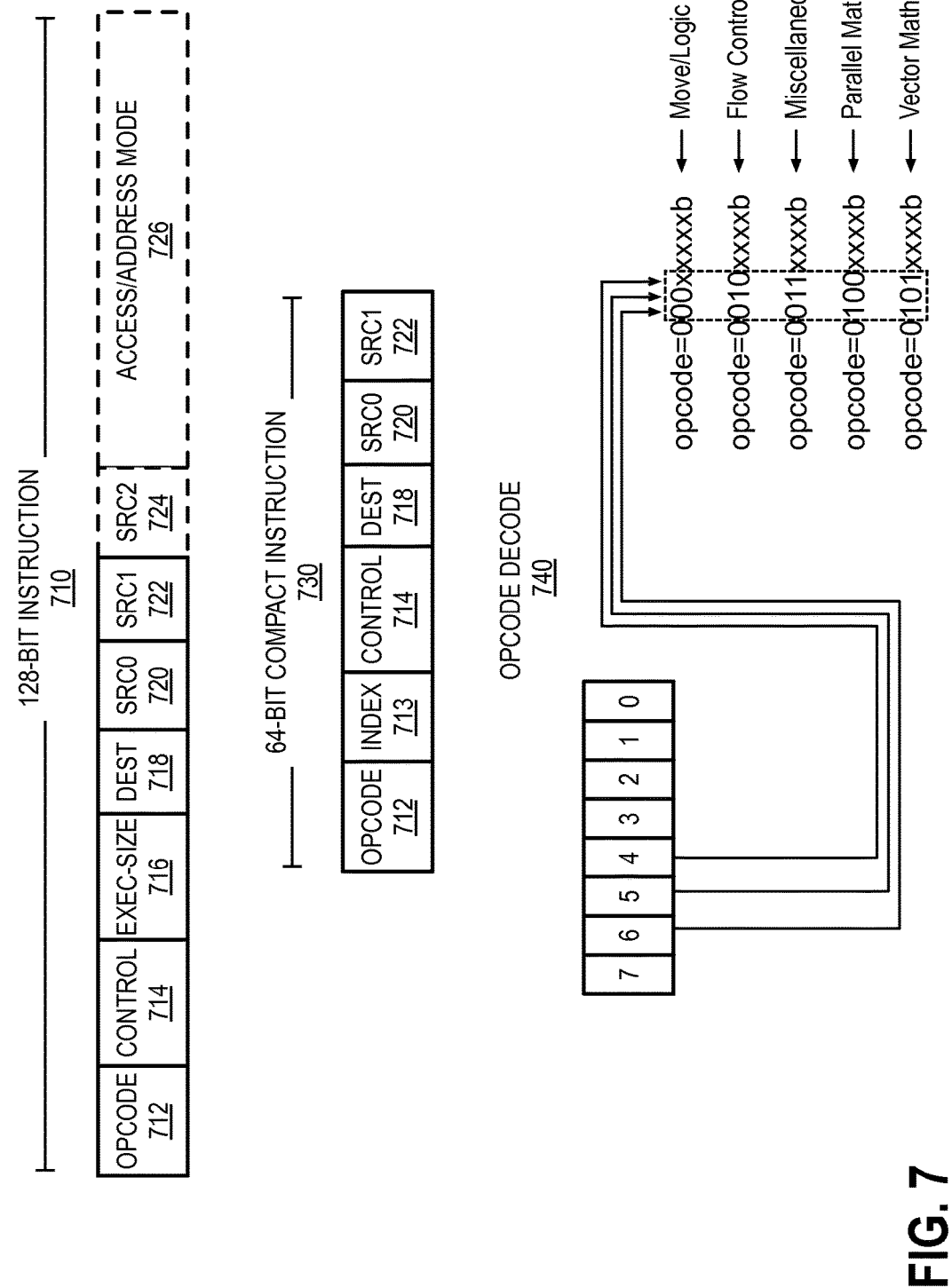
FIG. 7 illustrates a graphics processor execution unit instruction format according to an embodiment.

Execution Units—FIGS. 5-7

FIG. 5 is a block diagram of another embodiment of a graphics processor having a scalable number of graphics cores. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates an embodiment of thread execution logic 600 including an array of processing elements. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
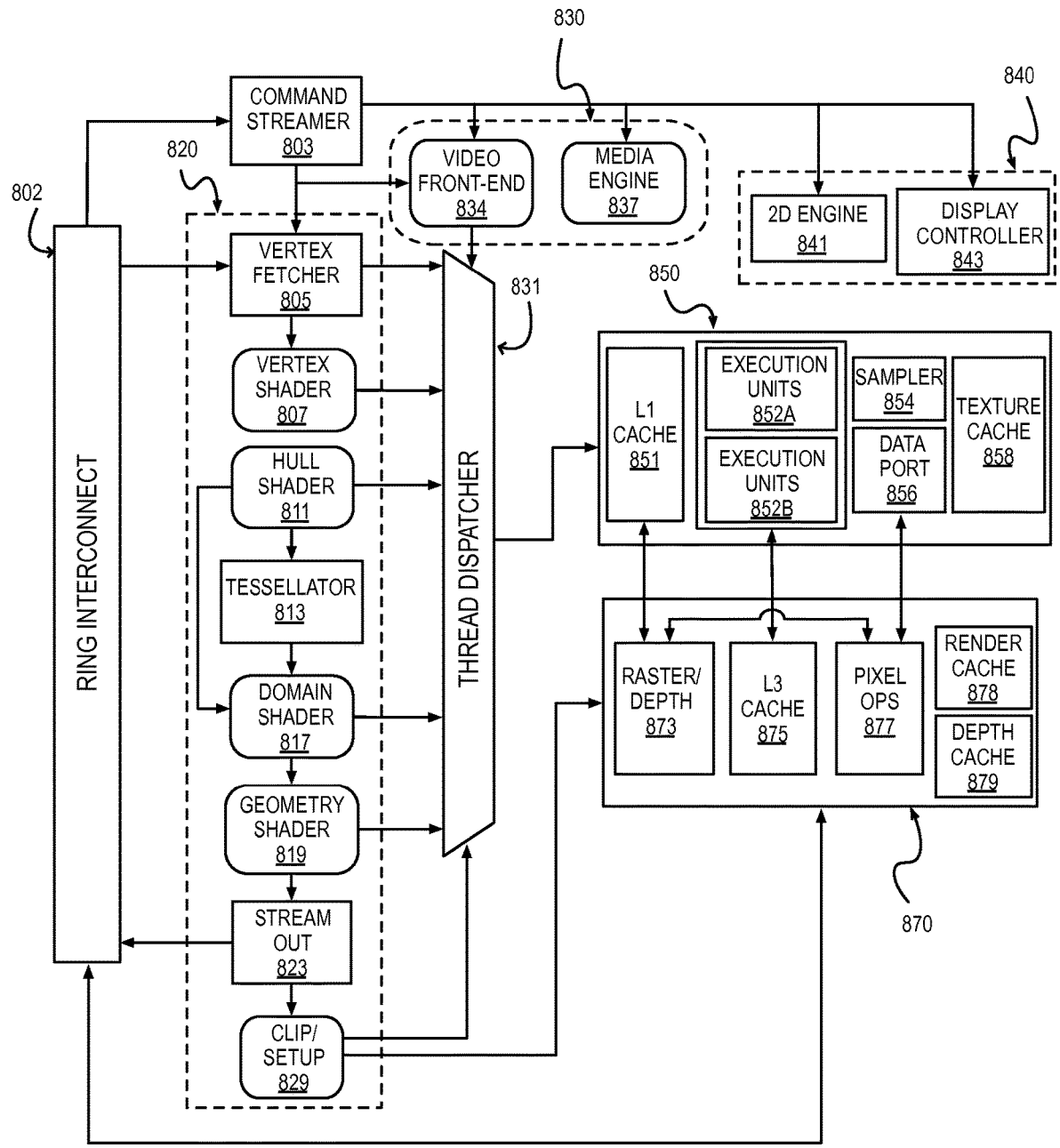
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9A:
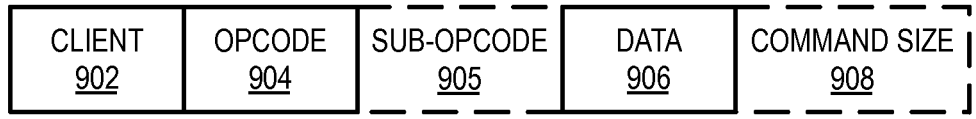
FIG. 9A is a block diagram illustrating a graphics processor command format according to an embodiment.
Figure 9B:
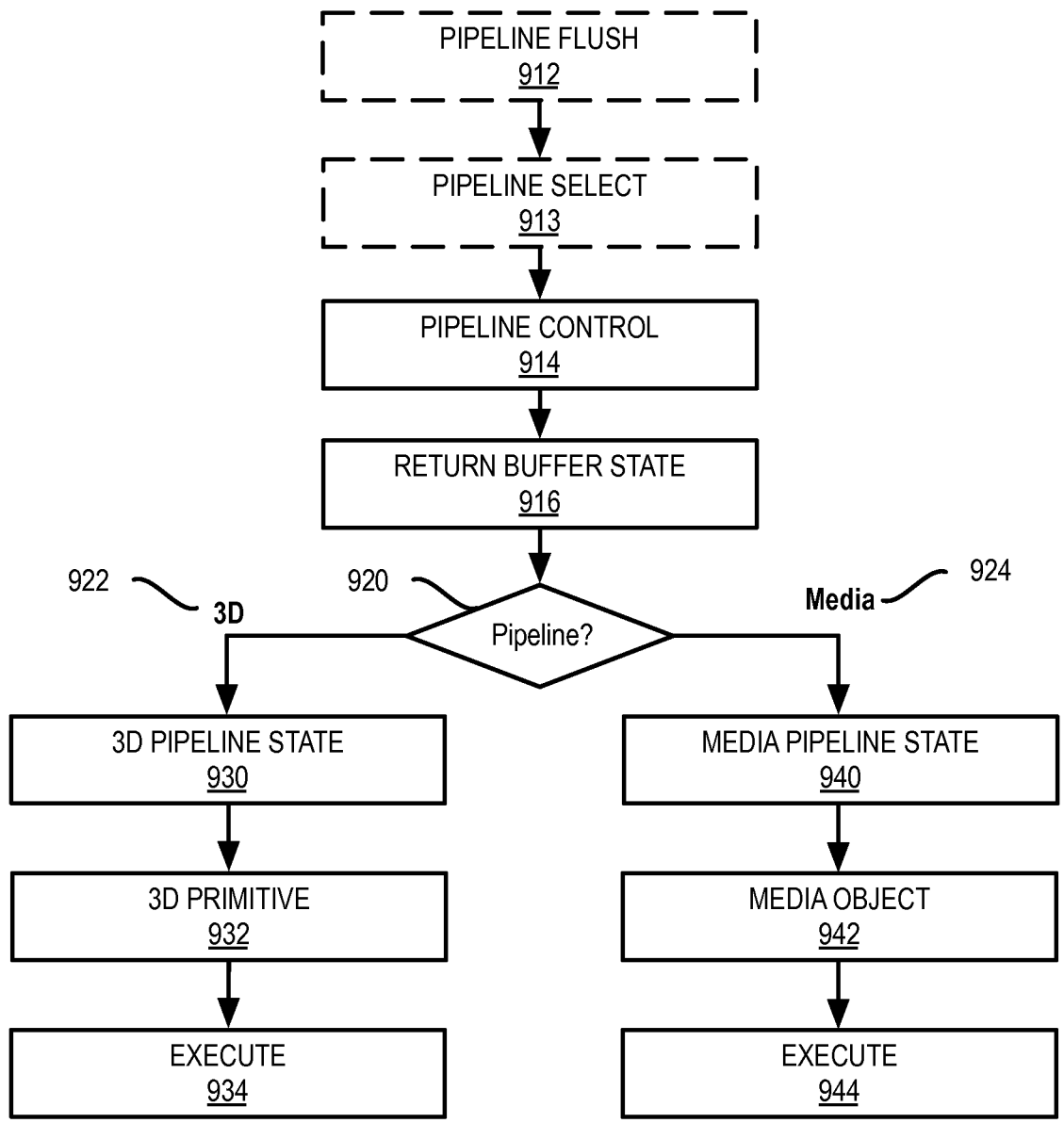
FIG. 9B is a block diagram illustrating a graphics processor command sequence according to an embodiment.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores.

In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
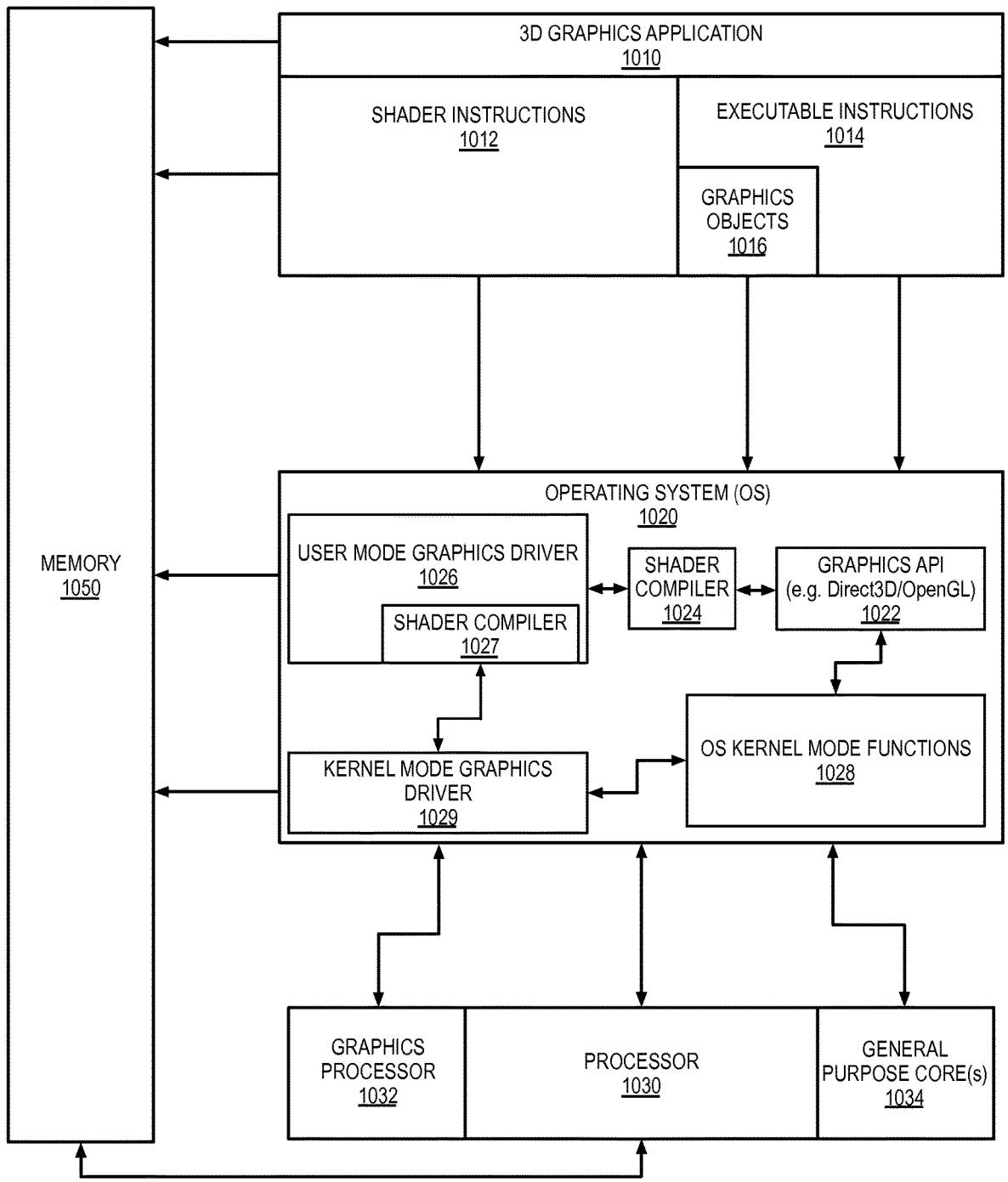
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a WINDOWS™ operating system available from the Microsoft Corporation of Redmond, Wash., a proprietary UNIX operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Data Distribution Fabric—FIG. 11-14

A hybrid data distribution fabric may be used as interconnecting logic for an embodiment of a graphics processor featuring scalable GPUs. In one embodiment, the hybrid fabric includes one or more physical data channels operating over a shared bus, with one or more programmable virtual channels on each physical channel. The virtual channels may be arbitrated independently, with channel access negotiated separately per virtual channel. Traffic over the virtual channels may be classified into one or more traffic classes. In one embodiment, a prioritization system allows virtual channels and traffic classes to be assigned a relative priority for arbitration. In one embodiment, traffic balancing algorithms operate to maintain substantially equal bandwidth and throughput to each node coupled to the fabric. In one embodiment, the hybrid fabric data distribution logic operates at a higher clock rate than the nodes couples to the fabric, allowing a reduced bus width while maintaining bus throughput. In one embodiment, each shared bus is separately clock gated when idle and sends an early indication of upcoming activity to trigger a bus wake event.

Figure 11:
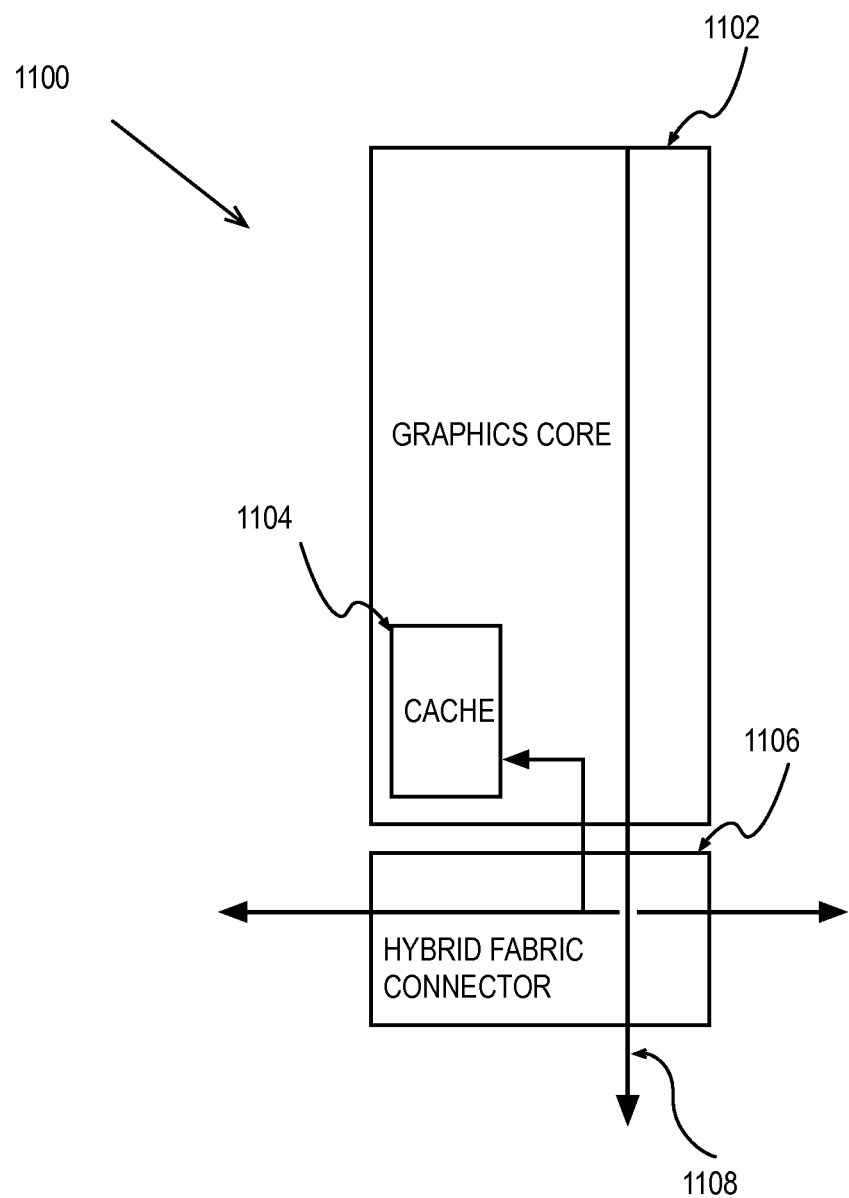
FIG. 11 is a block diagram of an embodiment of a graphics core fabric assembly.

FIG. 11 is a block diagram of an embodiment of a graphics core fabric assembly 1100 including a graphics core 1102, graphics core cache 1104, and hybrid fabric connector 1106. The hybrid fabric connector 1106 couples the graphics core fabric assembly 1100 to a fabric bus 1108. An embodiment of the hybrid data distribution fabric assembly 1100 is available for multiple levels of abstraction within the graphics processor. The graphics core 1102 includes any of the graphics execution logic described herein, such as a the scalable execution unit array 414 of FIG. 4, graphics cores 580A of FIG. 5, or an execution unit 608A of FIG. 6. Graphics core cache 1104 includes local graphics core cache memory, which stores incoming data from the fabric connector 1106. The graphics core cache 1104 can also store outgoing data before transmission by the data distribution fabric connector 1106.

The fabric connector 1106 is a fabric node that can receive, buffer, transmit, and re-transmit packets of data along the hybrid fabric 1108. The hybrid fabric connector 1106, in one embodiment, receives a packet on one channel of the hybrid fabric and switches the packet by re-transmitting the packet over a different channel. An embodiment of the hybrid fabric connector 1106 couples with the graphics core cache 1104. The connector 1106 writes data destined for the graphics core 1102 into the graphics core cache 1104, and reads data from the graphics core cache 1104 for transmission to shared memory, or to a different graphics core. Each graphics core has a core identifier and a hash identifier that are used to address data packets on the hybrid fabric and to perform traffic load balancing across the fabric nodes.

The hybrid fabric bus 1108 may include a single bus line or multiple bus lines. In one embodiment, the hybrid fabric bus 1108 includes multiple programmable data channels over which packet-based data messages are transmitted for each graphics core 1102. The multiple channels of the hybrid fabric bus 1108 are shared between the multiple graphics cores and support multiple traffic classes of data. The number of channels is configurable based on the number of graphics cores, the graphics core workload, and the utilization and capacity of the memory in the graphics processing system (e.g., local/shared cache, system memory, etc.).

Figure 12A:
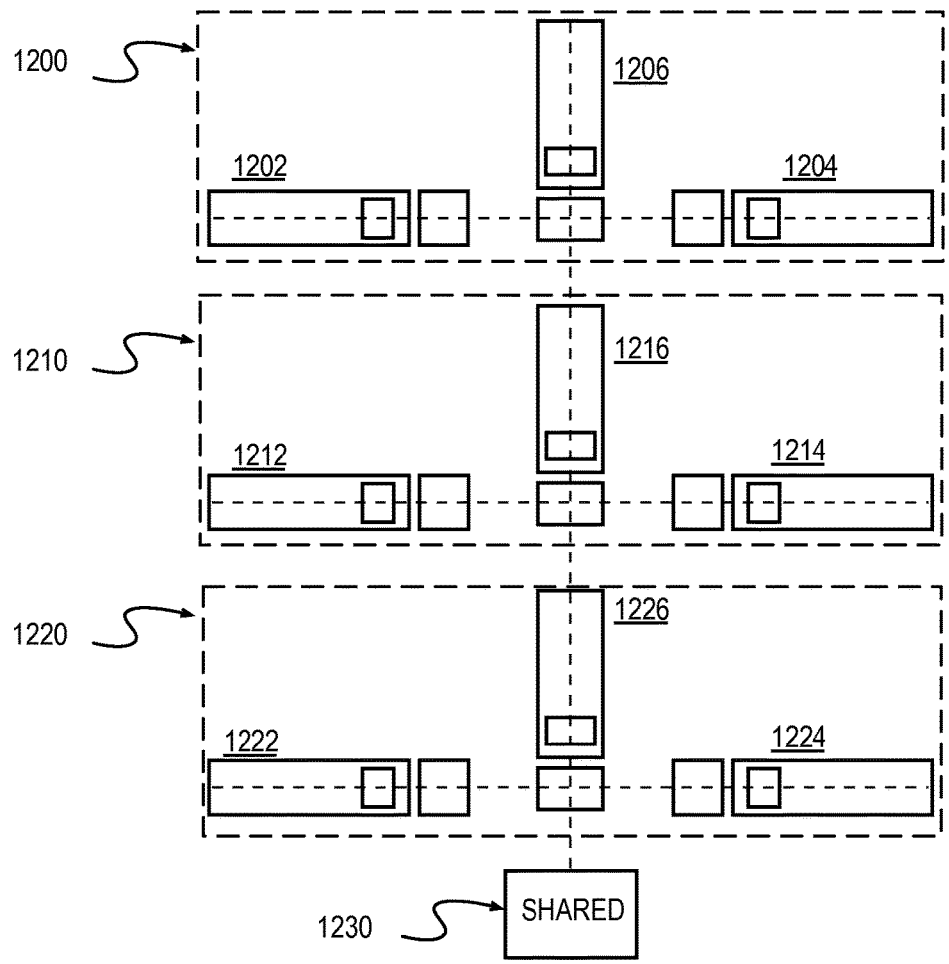
FIG. 12A-B illustrate multiple exemplary graphics core topologies.
Figure 12B:
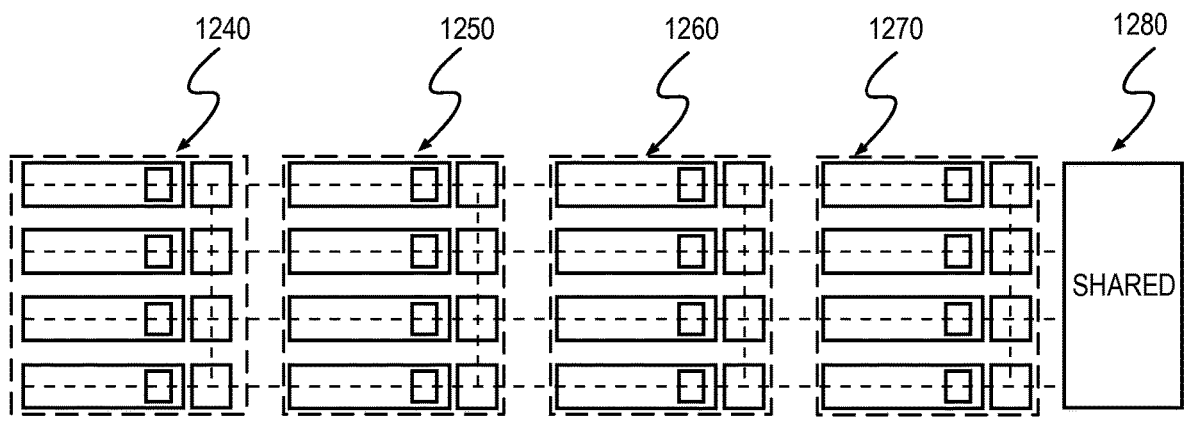

FIGS. 12A-B illustrate multiple exemplary graphics core topologies. FIG. 12A shows a tree topology in which nine graphics cores are coupled via an embodiment of the hybrid fabric. FIG. 12B shows a mesh topology in which sixteen graphics cores are coupled via an embodiment of the hybrid fabric. The hybrid fabric is configurable for each of the possible graphics core topologies. The graphics cores may be arranged in a stacked 3D integrated circuit including multiple graphics cores in multiple vertical layers. The stacked integrated circuit may include a die-on-die integrated circuit, a wafer-on-wafer integrated circuit, and/or one or more combinations of wafer-on-die or die-on-wafer circuits. However, other 3D circuit manufacturing methods may also be used.

FIG. 12A shows nine graphics cores are coupled in a tree topology. A first layer 1200 includes three graphics cores, where a first graphics core 1202, couples with a second graphics core 1204 via a third graphics core 1206. The third graphics core 1206 couples with a sixth graphic core 1216 in a second layer 1210 via one or more through-silicon-vias ("TSV"s). Additionally, the sixth graphics core 1216 couples a fourth graphics core 1212 with a fifth graphics core 1214. The sixth graphics core 1216 additionally couples with a ninth graphics core 1226 in a third layer 1220, which includes a seventh graphics core 1222 and an eighth graphics core 1224. The graphics cores, via the hybrid fabric, couple and communicate with shared resources 1230 including shared memory and other common resources shared by the graphics cores, such as shared pixel back end hardware. The hybrid fabric may be configured to provide additional bandwidth or throughput to high-traffic hybrid fabric connectors, or provide other load balancing or traffic management techniques to maintain substantially equal bandwidth for data flowing to, from, and through each graphics core.

In the exemplary block diagram of FIG. 12B, sixteen graphics cores are assembled in a mesh topology. In one possible configuration, four layers, each having four graphics cores, are stacked. A first layer 1240 includes four graphics cores, where each graphics core couples with a counterpart graphics core in a second layer 1250. Next, each graphics core in the second layer 1250 couples with a counterpart graphics core in the third layer 1260. Next, each graphics core in the third layer 1260 couples with a counterpart graphics core in a fourth layer 1270. Finally, each graphics core in the fourth layer 1270 couples with shared resources 1280, including shared memory. The number of layers, and the number of cores per layer is exemplary and embodiments are not so limited, and multiple topologies are supported. The hybrid fabric may be configured to enable communication between multiple graphics cores arranged in differing topologies based on die-size, bandwidth and throughput requirements.

Figure 13:
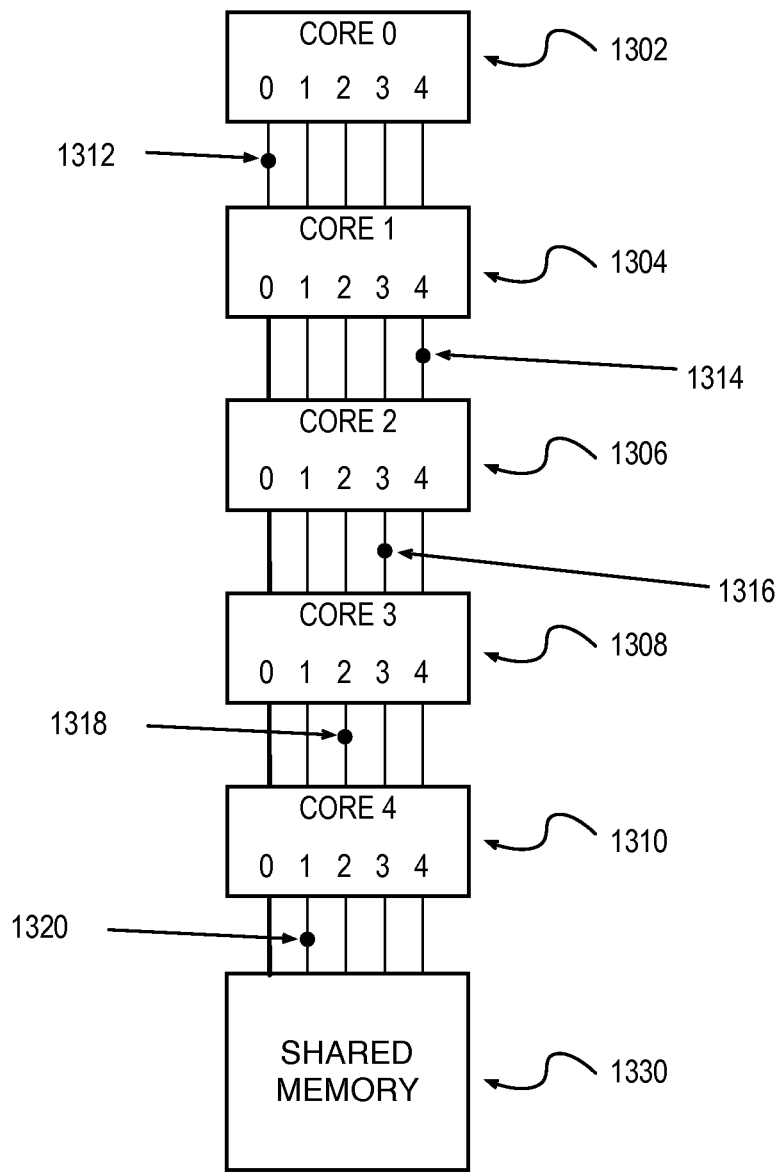
FIG. 13 is a block diagram of an embodiment of a stacked integrated circuit including a data distribution fabric.

FIG. 13 is a block diagram of an embodiment of a stacked 3D integrated circuit including five vertically stacked graphic cores. The fabric channels illustrated may be separate buses or may be wired over a shared bus. Each graphics core may send or receive data on any channel. Data packets travelling on the hybrid fabric may pass through the fabric connectors of multiple cores before reaching the target. While a core may conduct cross-core communication on a single channel, a packet may be switched from channel to channel when transiting a core, or a fabric connector coupled to the core. A channel arbitration algorithm may be employed to balance traffic on each channel to maintain equal communications bandwidth for each core. While graphics cores are illustrated, a fabric connector coupled to the graphics core may perform at least some of the described functionality.

An example arbitration algorithm is the 'stack optimization' algorithm used for memory bound traffic. The graphics processor cores 1302-1310 shown in FIG. 13 each couples with a respective hybrid fabric connector (e.g., hybrid fabric connector 1106 of FIG. 11). The hybrid fabric connectors couple the interconnected cores with a region of shared memory 1330. Table 1 below illustrates the results of an exemplary channel arbitration algorithm to balance memory-bound traffic between five graphics cores and shared memory.

TABLE 1

| Fabric Logic in Respective Cores | Stack Optimization Algorithm | | | | |
|---|---|---|---|---|---|
| | Channel 0 | Channel 1 | Channel 2 | Channel 3 | Channel 4 |
| Core 0 Channel Assignment | Core 0 Traffic | Core 1 Traffic | Core 2 Traffic | Core 3 Traffic | Core 4 Traffic |
| Core 1 Channel Assignment | Core 1 Traffic | Core 2 Traffic | Core 3 Traffic | Core 4 Traffic | Core 0 Traffic |

TABLE 1-continued

Stack Optimization Algorithm

| Fabric Logic in Respective Cores | Channel 0 | Channel 1 | Channel 2 | Channel 3 | Channel 4 |
|---|---|---|---|---|---|
| Core 2 Channel Assignment | Core 2 Traffic | Core 3 Traffic | Core 4 Traffic | Core 0 Traffic | Core 1 Traffic |
| Core 3 Channel Assignment | Core 3 Traffic | Core 4 Traffic | Core 0 Traffic | Core 1 Traffic | Core 2 Traffic |
| Core 4 Channel Assignment | Core 4 Traffic | Core 0 Traffic | Core 1 Traffic | Core 2 Traffic | Core 3 Traffic |

As shown in the Channel 0 column of Table 1, each core is configured to originate memory bound data on channel 0, while switching pass-through traffic from other cores to other channels. For example, a memory bound data packet 1312 is transmitted from graphics core zero 1302 on channel 0. Core one 1304 switches the packet 1314 to channel four because the stack optimization algorithm specifies that memory bound traffic from graphics core zero 1302 is to pass through on channel four. Thus, core two 1306 switches the packet 1316 to channel three. Core three 1308 switches the packet 1318 to channel two. Core four 1310 switches the packet 1320 to channel one. While FIG. 13 and Table 1 illustrate an exemplary algorithm for an exemplary type of traffic on the hybrid fabric. Other algorithms may be used for other types of traffic. In one embodiment, differing types of traffic are grouped into differing traffic classes to better facilitate traffic management.

Figure 14:
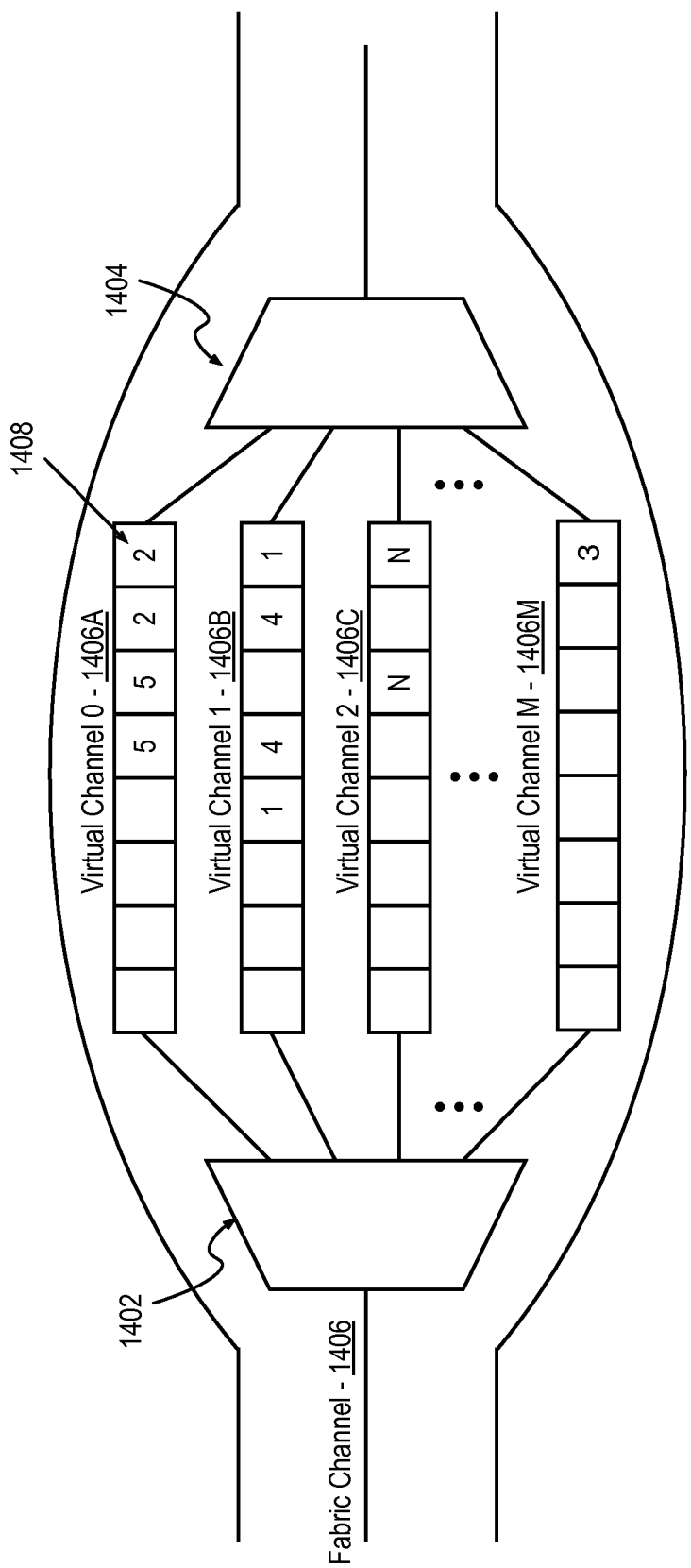
FIG. 14 is an illustration of multiple traffic classes carried over virtual channels, according to an embodiment.

FIG. 14 is an illustration of multiple traffic classes carried over virtual channels, according to an embodiment. A first fabric connector 1402 and second fabric connector 1404 facilitate communication over a fabric channel 1406 having up to 'M' virtual channels 1406A-M. The virtual channels enable the transfer of variable length information over a fixed set of physical channels. The virtual channels may be permanent virtual channels, or the virtual channels may be dynamically enabled or disabled based on the system configuration. Using permanent virtual channels allows fixed channel IDs, which minimizes the overhead of virtual channel management. Dynamically configuring channels increases design flexibility at the expense of additional channel management overhead.

Each virtual channel may be assigned multiple traffic classes. A traffic class is a division of traffic that is related for arbitration. Each virtual channel may carry up to 'N' traffic classes. Each class of traffic is assigned to a specific virtual channel through programming (fuses, configuration registers etc.). Up to 'L' classes of traffic types may be assigned to a given virtual channel.

TABLE 2

Traffic Class Assignment

| # | Traffic Class | Virtual Channel |
|---|---|---|
| 1 | Class 1 | 1 |
| 2 | Class 2 | 0 |
| 3 | Class 3 | M |
| 4 | Class 4 | 1 |
| 5 | Class 5 | 0 |
| ... | | |
| N | Class N | 2 |

Table 2 above shows an exemplary traffic class to virtual channel assignment as illustrated in FIG. 14. The hybrid fabric classifies each unit of incoming traffic and may include logic to ensure that the incoming unit travels within its assigned virtual channel. In one embodiment, data transmission over the channels occurs in first-in-first-out (FIFO) order, and channel arbitration occurs based on virtual channels. Traffic within a virtual channel may block the transmission of additional traffic on the same virtual channel. However, a given virtual channel will not block a different virtual channel. Accordingly, traffic on different virtual channels is arbitrated independently.

In one embodiment, coherency is maintained during data transmission for individual threads operating on a graphics core at both the graphics core cache and at the hybrid fabric connector node for the graphics core. The hybrid fabric nodes route traffic originating from a single thread within the same traffic class, and the traffic classes are assigned to a specific virtual channel. Data within a single traffic class on a single virtual channel is transmitted in FIFO order. Thus, data from a single thread is strictly ordered when transmitted via the hybrid fabric, and per-thread coherency is maintained, to avoid read-after-write or write-after-read data hazards. In one embodiment, thread group coherency is maintained via a global synchronization mechanism with shared memory.

TABLE 3

Traffic Class Prioritization

| # | Traffic Class | Priority |
|---|---|---|
| 1 | Class 1 | 2 |
| 2 | Class 2 | 1 |
| 3 | Class 3 | 4 |
| 4 | Class 4 | 2 |
| 5 | Class 5 | 1 |
| ... | | |
| N | Class N | 3 |

Table 3 above shows an exemplary traffic class prioritization. A priority algorithm may be programmed to determine the priority to assign to each of the traffic classes. The programmable traffic class priorities allow the traffic classes to be used as an arbitrary traffic grouping mechanism, where traffic may be grouped within a class merely to maintain coherency, or specific traffic can be assigned a high priority and dedicated to high priority data. For example, class 1 and class 4, each assigned to virtual channel one 1406B, may be assigned a priority of 2. Class 2 and class 5, each assigned to virtual channel 0 1406A, may be assigned a priority of 1. A traffic class 'N' may be assigned to virtual channel two 1406C with a priority of 3. Traffic in class 2 may be latency sensitive data that should be transmitted as soon as possible or should not be blocked by other traffic classes, while traffic in class 1 may be moderately latency sensitive traffic from a single thread that is grouped to maintain coherency.

A traffic class may be assigned a priority relative to all traffic classes or relative to the priority of traffic classes on the same virtual channel. In one embodiment, the priority scheme is designed by assigning weights to the traffic classes, where a higher weight indicates a higher priority. A fair prioritization algorithm may be employed, where each participant is guaranteed a minimum amount of bandwidth to prevent starvation. In one embodiment, an absolute priority algorithm is used under certain circumstances, where higher priority traffic always blocks lower priority.

Where absolute priority is in use, additional algorithms are in place to prevent a communication deadlock. The use of virtual channels and traffic classes in combination reduces the likelihood of a deadlock, as a single traffic class having absolute priority on a given virtual channel does not block traffic on a different virtual channel. In one embodiment, if a starvation condition or a potential deadlock is detected on one virtual channel, blocked traffic classes may be re-assigned to a different virtual channel.

TABLE 4

Virtual Channel Prioritization

| # | Virtual Channel | Priority |
|---|---|---|
| 1 | 1 | 2 |
| 2 | 2 | 1 |
| 3 | 3 | 3 |
| ... | | |
| M | M | 4 |

Table 4 below shows an exemplary virtual channel prioritization. As with traffic classes, each virtual channel may also receive a priority and channel arbitration can factor the relative priorities of the virtual channels. For example, data traffic on virtual channel 2 may have a higher relative priority than data on other virtual channels. A weighted priority system may be employed with virtual channel prioritization, where a higher weight indicates a higher priority. A fair priority system or an absolute priority system may be used.

Figure 15:
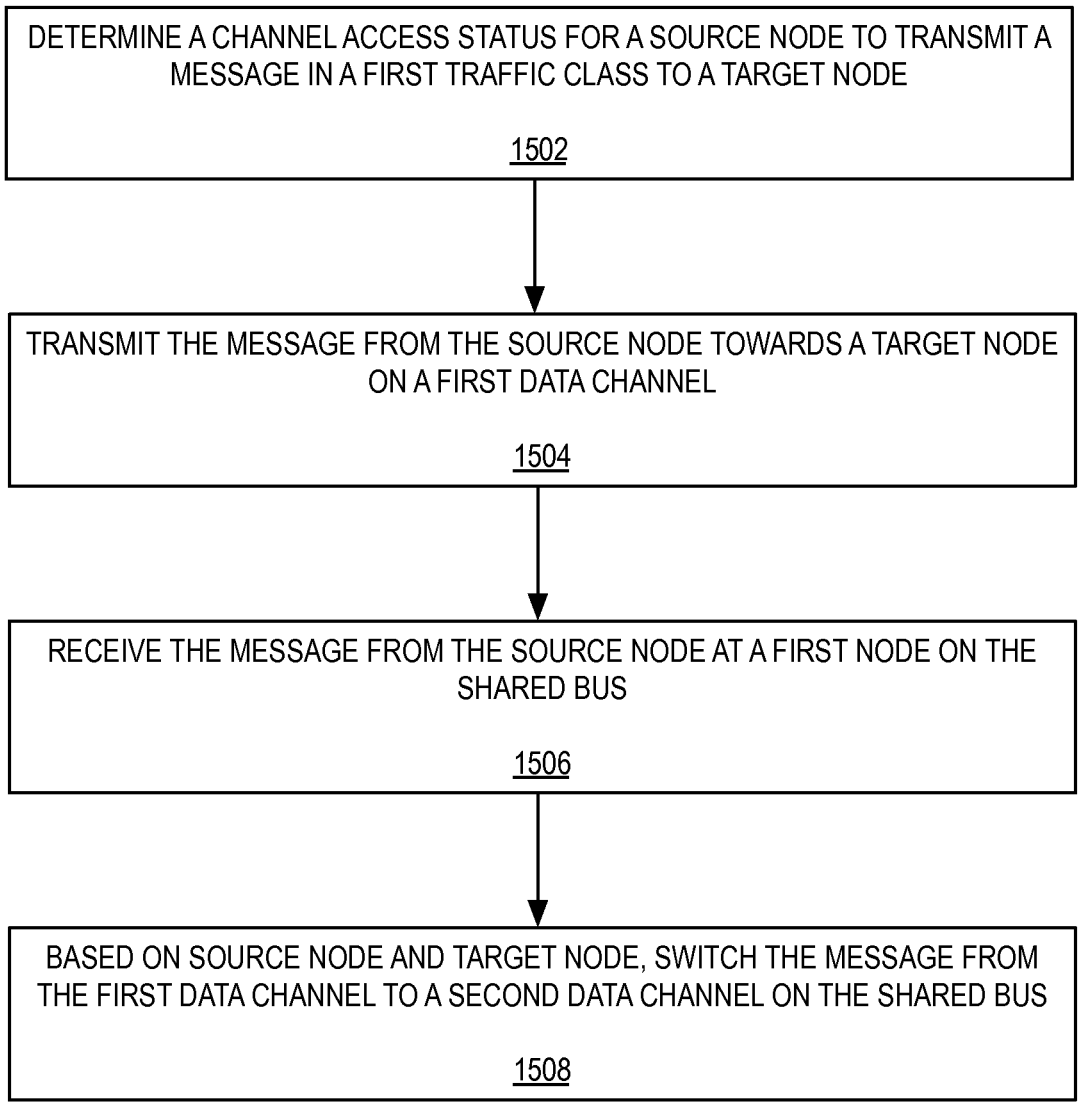
FIG. 15 is a flow diagram of a data transmission sequence, according to an embodiment.

FIG. 15 is a flow diagram of a data transmission sequence, according to an embodiment. A source node, such as a hybrid fabric connector coupled to a graphics processor, determines channel access status for a channel before transmitting a message packet over a channel on the hybrid fabric, as shown at block 1502. The message can be classified into one of multiple possible traffic classifications, each classification having a relative priority on the channel. Channel access can be determined via any suitable channel access protocol, such as a time division multiple access protocol, or a carrier sense multiple access protocol.

Having determined that a first channel is available, the source node can transmit the message from the source node towards a target node, as shown at block 1504. The message can be received by a first node on the shared bus of the hybrid fabric, as shown at block 1506. The first node may be coupled to one of multiple graphics processors coupled by the hybrid fabric. Based on several factors, such as the source node, the target node, the traffic class, and the channel in which the message is received, the first node may switch the message from the first node to the second node on the shared bus, as shown at block 1508. The first node may switch the message as part of a traffic balancing protocol, such as the stack optimization algorithm of Table 1, or as part of a directional routing protocol, depending on the graphics core topology served by the hybrid fabric. In one embodiment, channel access is determined based on multiple virtual channels carried across a shared bus, where channel access for each virtual channel is arbitrated separately from other virtual channels.

In one embodiment the hybrid fabric interconnect logic operates at a higher clock frequency than the nodes connected by the interconnect logic. A single message between nodes may be divided into a number of separate messages based on the frequency ratio between the fabric interconnect and the nodes. A fabric node may transmit a message during each of the node's clock cycles, and the message is divided into multiple messages to be sent between clock cycles. The division of the message is transparent to the fabric node, allowing a reduction in the width of the physical layer of the interconnecting logic while maintaining performance.

In one embodiment, the interconnect logic of the hybrid fabric is power managed and clock gated. A distributed approach may be used for clock gating, where each bus line uses a local gated clock that is disabled when the bus is idle. Each bus issues an early indication of incoming activity, which enables the clock when a message is to be received along the bus, or a virtual channel associated with the bus. Accordingly, power is dissipated only on active buses. While idle, a bus consumes only static power, and is otherwise in a low power state.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

As used herein, references to one or more "embodiments" are to be understood as describing a particular feature, structure, or characteristic included in at least one implementation. Thus, phrases such as "in one embodiment" or "in an alternate embodiment" appearing herein, each describe various embodiments and implementation, and do not necessarily all refer to the same embodiment. However, they are also not necessarily mutually exclusive.

In one embodiment, a processor comprises one or more graphics cores and interconnecting logic having at least one data channel to interconnect the one or more graphics processor cores. The at least one data channel may be carried over a shared bus. The interconnect logic couples the interconnected cores with a shared resource. The interconnect logic enables data distribution between the interconnected cores and the shares resource over one or more virtual channels carried over the at least one data channel. The virtual channels may include a programmable traffic classification system having multiple classifications of traffic.

The multiple classifications of traffic may have priorities assigned to each classification. The priorities may be arbitrated relative to other traffic classifications on the same virtual channel. In one embodiment the one or more graphics processor cores comprise a 3D integrated circuit stack including multiple graphics processor cores. In one embodiment, the multiple graphics processor cores are coupled via multiple shared buses, where each bus is separately clock gated during idle periods.

In one embodiment, a system comprises a processor including a plurality of cores, where at least one core includes an instruction set for processing graphics instructions. The at least one graphics processing core couples with a shared resource on the processor via interconnect logic having at least one clock gated physical data channel and one or more virtual channels, each virtual channel to carry data having multiple traffic classifications. The multiple traffic classifications may be programmable, and each of the multiple traffic classifications may be assigned to a virtual channel. The system may also include memory coupled to the processor.

Data representing a design to perform an embodiment described herein may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the design data may be stored in a form of a machine-readable medium.

In one embodiment, a machine-readable medium stores data, which if performed by at least one machine, causes the at least one machine to fabricate at least one integrated circuit to perform a method comprising determining a channel access status on a multiple node shared bus for a message from a source node to a target node, wherein at least one of the multiple nodes couples with a graphics processor core and at least one of the nodes couples with a shared resource, transmitting a message from the message source to a message target over a first data channel, where the message includes a first traffic classification having a first priority, receiving the message at a first data bus connector coupled with a graphics processor core and based on at least the source node and the target node, switching the message from a first data channel to a second data channel. The at least one integrated circuit fabricated may be a 3D integrated circuit stack including multiple graphics processor cores.

In one embodiment, determining channel access comprises determining, using a channel access protocol, if a message can be transmitted over a third data channel, and after determining that transmission over the third data channel is blocked, transmitting a message over the first data channel. Channel access may be determined by a time division multiple access protocol or a carrier sense multiple access protocol.

One embodiment provides for a heterogeneous three-dimensional circuit stack comprising a central processing unit (CPU) and a graphics processing unit (GPU) stacked with the CPU. The GPU cn be communicatively coupled with the CPU through one or more through-silicon-vias (TSVs). The heterogeneous three-dimensional circuit stack additionally includes a fabric interconnect including interconnect logic to communicatively couple the CPU and the GPU with a shared resource. The interconnect logic is to enable coherent access to the shared resource for execution threads of the GPU. To enable coherent access to the shared resource, the interconnect logic can route traffic that originates from a single execution thread of the graphics processor within a single traffic class. In one embodiment the interconnect logic operates at a higher frequency either or both of the CPU and the GPU.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations without departing from their scope. Therefore, the illustrations and examples herein should be construed in an illustrative, and not a restrictive sense. The scope and spirit of the invention should be measured solely by reference to the claims that follow.

What is claimed is:

1. A processor comprising:
a three-dimensional (3D) integrated circuit stack including multiple graphics processor cores; and
interconnect logic to interconnect the graphics processor cores of the 3D integrated circuit stack to enable data distribution between the graphics processor cores over a virtual channel including multiple programmatically pre-assigned traffic classifications.

2. The processor of claim 1, wherein the virtual channel is transmitted over at least one physical data channel, the interconnect logic includes multiple data channels, and each of the multiple data channels is a separately clock gated bus.

3. The processor of claim 2, wherein each bus is to use early indications to signal incoming activity.

4. The processor of claim 1, wherein the interconnect logic is to couple the graphics processor cores to a shared resource and enable coherent access to the shared resource for execution threads of the graphics processor cores, wherein to enable coherent access to the shared resource the interconnect logic is to route traffic that originates from a single execution thread of the graphics processor cores within a single traffic classification.

5. The processor of claim 4, wherein the shared resource is a shared memory or a shared cache.

6. The processor of claim 5, wherein the interconnect logic is to enable the data distribution over multiple virtual channels, the multiple virtual channels including the virtual channel and one or more additional channels.

7. The processor of claim 6, wherein the multiple virtual channels are to be arbitrated based on a programmable priority system, at least one virtual channel is to be assigned multiple traffic classifications, and each of the multiple traffic classifications has a programmable priority.

8. The processor of claim 7, wherein the programmable priority is relative to traffic classifications within a same virtual channel of the multiple virtual channels.

9. The processor of claim 1, wherein the interconnect logic operates at a higher frequency than the graphics processor cores.

10. The processor of claim 1, additionally including a set of interconnect nodes to couple the graphics processor cores with the interconnect logic, wherein the interconnect logic includes multiple data channels and the set of interconnect nodes is configured to switch data between the multiple data channels when transiting one of the graphics processor cores.

11. A graphics processor device comprising:
a system interface bus;
a processor including a three-dimensional (3D) circuit stack including a plurality of graphics processor cores coupled via interconnect logic having at least one clock gated physical data channel and a set of virtual channels including one or more virtual channels, the one or more virtual channels having multiple programmatically pre-assigned traffic classifications; and
memory coupled to the interconnect logic and at least one graphics processor core of the plurality of graphics processor cores, the memory to store data for the at least one graphics processor core before transmission via the interconnect logic.

12. The graphics processor device as in claim 11, wherein the plurality of graphics processor cores couple with a shared resource on the processor via the interconnect logic, wherein the shared resource on the processor is a shared memory resource.

13. The graphics processor device as in claim 12, wherein the shared memory resource includes a shared cache memory.

14. The graphics processor device of claim 11, wherein the set of virtual channels includes multiple virtual channels, the multiple virtual channels in the set of virtual channels are to be arbitrated based on a programmable priority system, and each of the multiple programmable traffic classifications is prioritized relative to other traffic classes assigned to a same virtual channel of the multiple virtual channels.

15. The graphics processor device of claim 11, wherein the graphics processor device is a graphics processor card.

16. A method comprising:
determining a channel access status on a multiple node shared bus for a message from a source node to a target node, wherein at least one node of the multiple node shared bus couples with a graphics processor core of an integrated circuit and at least one node of the multiple node shared bus couples with a shared resource on the integrated circuit;
transmitting a message from the source node to the target node over a first data channel, wherein the message is associated with a first traffic classification having a first priority;
receiving the message at a first data bus connector coupled with the graphics processor core; and
based on at least the source node and the target node, switching the message from the first data channel to a second data channel.

17. The method of claim 16, additionally including determining that the message is associated with the first traffic classification and switching the message from the first data channel to the second data channel based at least on the first traffic classification.

18. The method of claim 16, wherein determining the channel access status comprises:
determining, using a channel access protocol, if a third data channel is available to transmit the message from the source node to the target node; and
after determining that transmission over the third data channel is blocked, transmitting the message over the first data channel.

19. The method of claim 18, wherein the first, second, and third data channel are virtual data channels.

20. The method of claim 19, wherein the channel access protocol is a time division multiple access protocol or a carrier sense multiple access protocol.

* * * * *